June 9, 1931. S. H. HEINMILLER 1,808,984
TOOTHED DRUM FOR QUACK GRASS DIGGERS AND PLOWS
Original Filed June 1, 1929
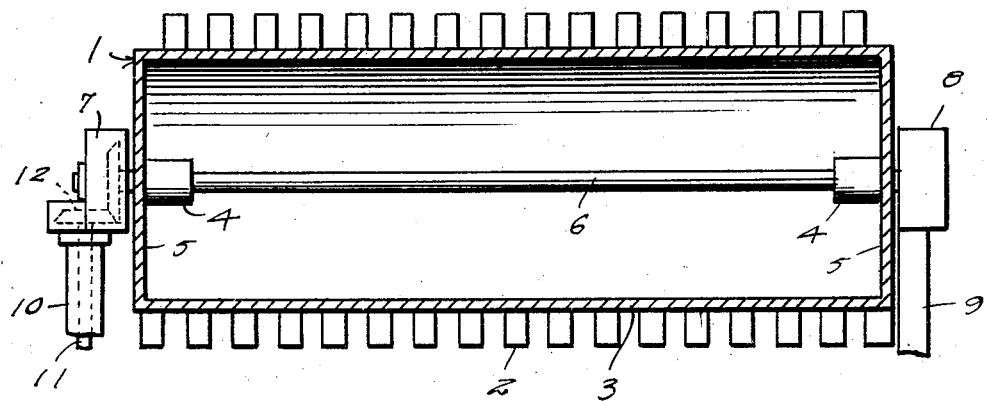
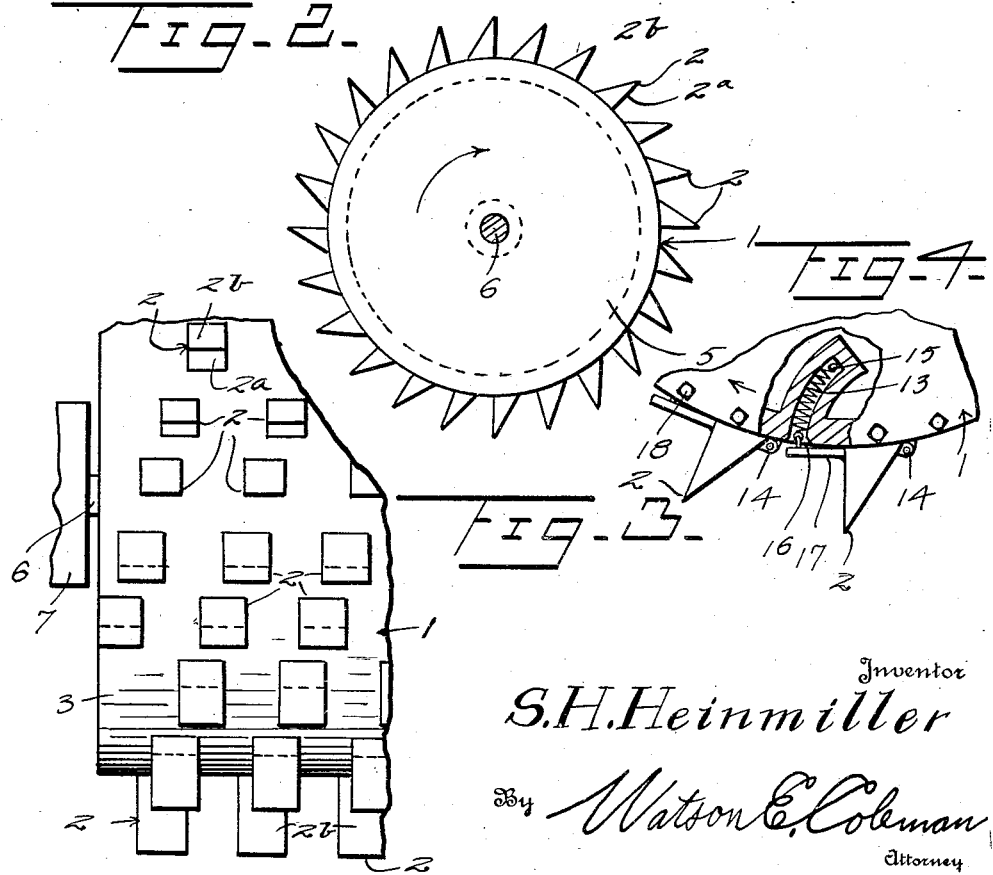
Inventor
S. H. Heinmiller
By Watson E. Coleman
Attorney Patented June 9, 1931

1,808,984

UNITED STATES PATENT OFFICE

SAMUEL H. HEINMILLER, OF NEW HAMPTON, IOWA

TOOTHED DRUM FOR QUACK GRASS DIGGERS AND PLOWS

Original application filed June 1, 1929, Serial No. 367,720. Divided and this application filed March 20, 1930. Serial No. 437,443.

This invention relates to the quack grass digger and plow forming the subject matter of my co-pending application filed June 1, 1929 and serially numbered 367,720, and embodying a frame adapted to be pivotally connected to a motor propelled vehicle having a power take-off shaft, a toothed drum journaled on the frame, and means adapted to establish a driving connection between the power take-off shaft and the drum.

The present invention, which constitutes a division of said application, relates more particularly to the toothed drum of the digger and plow, and has for one of its objects to provide a drum which shall embody teeth of such formation and so relatively arranged thereon as to effect, during the movement and rotation of the drum over a field, the thorough loosening of the soil and the lifting and spreading of the grass roots over the loosened soil.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a sectional view taken on a horizontal plane extending longitudinally and centrally through the toothed drum;

Figure 2 is a view in end elevation of the toothed drum;

Figure 3 is a plan view of a fragmentary portion of the toothed drum, and

Figure 4 is a view partly in end elevation and partly in vertical section illustrating the manner in which the teeth may be yieldingly connected to the drum.

The drum 1 is of hollow formation and closed at its ends. The drum 1 is provided with teeth 2 which extend outwardly from its cylindrical wall 3, and is provided with sleeves 4 which extend inwardly in axial alinement from its end walls 5. The drum 1 is fixedly secured to a shaft 6 which extends through the sleeves 4 and has its ends journalled in bearings 7 and 8 carried by the rear ends of the side bars 9 and 10 of a frame adapted to connect the drum to a tractor or other motor propelled vehicle. The drum is adapted to be rotated in a forward direction and at a high rate of speed, from the power take-off shaft of the tractor or other motor driven vehicle by means which includes a shaft 11 journalled in the frame bar 10 and connected to the shaft 6 by gears 12. The direction in which the drum is to be driven is indicated by the arrow in Figure 2. As the frame and the drum rotating means are fully disclosed in my earlier application and constitute no part of the present invention, a further description thereof is deemed unnecessary.

The teeth 2 have angularly related front and rear sides 2a and 2b, respectively. In other words, the teeth 2 are of substantially V-form in side elevation and rectangular in front elevation, and have long, sharp and straight outer ends and broad inner ends. The teeth 2 are secured to the drum wall 3 with their broad inner ends in contact with said wall and with their sharp outer ends arranged parallel to the axis of the drum, and they may be fixed rigidly or pivotally connected to the drum.

The forward sides 2a of the teeth 2 extend radially or substantially radially from the drum 1, and the rear sides 2b of the teeth incline forwardly from the drum. The teeth 2 are arranged in rows extending spirally about the drum 1, and the teeth of the respective rows are arranged in staggered relation.

When the teeth 2 are pivotally connected to the drum 1 they are yieldingly held in normal position by springs, one of which is shown in Figure 4 and designated 13. The hinge 14 which connects each of the teeth 2 to the drum 1 is secured to the rear inner ends of the tooth and to the drum. The spring 13 extends into the drum 1 and is connected at its inner end, as at 15, to the drum. The spring 13 is connected at its outer end, as at 16, to the front end of an arm 17 extending forwardly from the inner end of the tooth. The springs, while holding the teeth in normal position, permit them to yield rearwardly when they encounter rocks or other obstructions, with the result that they will not become damaged by reason of such contact. The ends walls 5 of the drum may be secured in place by cap screws 18 or in any other suitable manner.

The formation of the teeth 2 and their relative arrangement and the arrangement of their front sides radially of the drum 1 enable them, when the drum is drawn over a field and rotated at a compartively high speed, to thoroughly loosen or pulverize the soil and to lift the grass roots and deposit them upon the loosened soil, with the result that the soil will be in the best possible condition for planting.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

In a quack grass digger and plow, a drum, teeth of V-form in side elevation and of rectangular form in front elevation, means pivotally connecting the teeth to the drum with their forward sides extending radially from the drum, and means yieldingly holding the teeth against pivotal movement.

In testimony whereof I hereunto affix my signature.

SAMUEL H. HEINMILLER.